United States Patent
Lambricht et al.

(10) Patent No.: US 10,275,095 B2
(45) Date of Patent: Apr. 30, 2019

(54) GLASS SHEET HAVING A HIGH TRANSMISSION IN THE INFRARED

(71) Applicants: AGC GLASS EUROPE, Louvain-la-Neuve (BE); AGC Inc., Chiyoda Ku (JP)

(72) Inventors: Thomas Lambricht, Perwez (BE); Audrey Dogimont, Sart-Dames-Avelines (BE)

(73) Assignees: AGC GLASS EUROPE, Louvain-la-Neuve (BE); AGC Inc., Chiyoda-ku (JP)

( * ) Notice: Subject to any disclaimer, the term of this patent is extended or adjusted under 35 U.S.C. 154(b) by 0 days.

(21) Appl. No.: 15/308,546

(22) PCT Filed: Apr. 22, 2015

(86) PCT No.: PCT/EP2015/058643
§ 371 (c)(1),
(2) Date: Nov. 2, 2016

(87) PCT Pub. No.: WO2015/172983
PCT Pub. Date: Nov. 19, 2015

(65) Prior Publication Data
US 2017/0075499 A1 Mar. 16, 2017

(30) Foreign Application Priority Data
May 12, 2014 (EP) .................................. 14167942

(51) Int. Cl.
*C03C 3/087* (2006.01)
*G06F 3/042* (2006.01)
*C03C 4/10* (2006.01)

(52) U.S. Cl.
CPC ............ *G06F 3/0421* (2013.01); *C03C 3/087* (2013.01); *C03C 4/10* (2013.01); *C03C 2204/00* (2013.01); *G06F 2203/04109* (2013.01)

(58) Field of Classification Search
CPC .. C03C 3/087; C03C 4/08; C03C 4/10; G06F 3/044; G06F 3/0421
See application file for complete search history.

(56) References Cited

U.S. PATENT DOCUMENTS

| | | | |
|---|---|---|---|
| 6,461,736 B1 | 10/2002 | Nagashima et al. | |
| 2005/0037911 A1 | 2/2005 | Fechner et al. | |
| 2006/0249199 A1 | 11/2006 | Thomsen et al. | |
| 2007/0161492 A1 | 7/2007 | Smith et al. | |
| 2008/0254301 A1 | 10/2008 | Fechner et al. | |
| 2008/0286548 A1* | 11/2008 | Ellison | C03B 17/06 428/220 |
| 2010/0154477 A1 | 6/2010 | Thomsen et al. | |
| 2010/0297415 A1 | 11/2010 | Cid-Aguilar et al. | |
| 2011/0098171 A1* | 4/2011 | Pedeboscq | C03B 5/193 501/32 |
| 2011/0267697 A1* | 11/2011 | Kohli | C03C 15/00 359/609 |
| 2012/0058880 A1 | 3/2012 | Shelestak | |
| 2013/0021300 A1 | 1/2013 | Wassvik | |
| 2014/0092052 A1* | 4/2014 | Grunthaner | G06F 3/044 345/174 |
| 2014/0147679 A1 | 5/2014 | Dogimont et al. | |
| 2014/0152914 A1* | 6/2014 | King | C03C 3/00 349/12 |
| 2014/0326314 A1 | 11/2014 | Dogimont et al. | |
| 2015/0072156 A1 | 3/2015 | Dogimont et al. | |
| 2016/0238778 A1* | 8/2016 | Hijiya | C03C 3/087 |

FOREIGN PATENT DOCUMENTS

| | | |
|---|---|---|
| JP | 2006-36626 A | 2/2006 |
| JP | 2007-238398 A | 9/2007 |
| WO | 2013/004470 A2 | 1/2013 |
| WO | 2013/072113 A1 | 5/2013 |
| WO | 2013/150053 A1 | 10/2013 |

OTHER PUBLICATIONS

International Search Report dated Jul. 20, 2015 in PCT/EP2015/058643 filed Apr. 22, 2015.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

The invention relates to a glass sheet having a composition that comprises, in an amount expressed in percentages by total weight of glass: $SiO_2$: 55-85%; $Al_2O_3$: 0-30%; $B_2O_3$: 0-20%; $Na_2O$: 5-25%; CaO: 0-20%; MgO: 0-15%; $K_2O$: 0-20%; BaO: 0-20%; Total iron (expressed in $Fe_2O_3$ form): 0.002-0.06%; said composition also comprising one of the following components: manganese (expressed in MnO form), in an amount ranging from 0.01 to 1% by weight; antimony (expressed in $Sb_2O_3$ form), in an amount ranging from 0.01 to 1% by weight; arsenic (expressed in $AS_2O_3$ form), in an amount ranging from 0.01 to 1% by weight; or copper (expressed in CuO form), in an amount ranging from 0.0002 to 0.1% by weight. The invention also relates to the use of such a glass sheet in a device employing infrared radiation propagating essentially inside said sheet. By virtue of its high transmission at infrared wavelengths, said glass sheet may advantageously be used, for example, in a screen or panel or pad, the glass sheet defining a touch surface.

20 Claims, No Drawings

GLASS SHEET HAVING A HIGH TRANSMISSION IN THE INFRARED

CROSS REFERENCE TO RELATED APPLICATIONS

The present application is a 35 U.S.C. § 371 national stage patent application of International patent application PCT/EP2015/058643, filed on Apr. 22, 2015, published as WO/2015/172983 on Nov. 19, 2015, the text of which is incorporated by reference, and claims the benefit of the filing date of European application no. 14167942.3, filed on May 12, 2014, the text of which is also incorporated by reference.

1 FIELD OF THE INVENTION

The present invention relates to a glass sheet having a high transmission in the infrared. The general field of the invention is that of optical touch panels placed over zones of display surfaces.

Specifically, by virtue of its high transmission in the infrared (IR), the glass sheet according to the invention may advantageously be used in a touch screen, touch panel or touch pad using the optical technology called planar scatter detection (PSD) or even frustrated total internal reflection (FTIR) (or any other technology requiring a high transmission in the IR) to detect the position of one or more objects (for example a finger or stylus) on a surface of said sheet.

Consequently, the invention also relates to a touch screen, a touch panel or a touch pad comprising such a glass sheet.

2 PRIOR-ART SOLUTIONS

PSD and FTIR technologies allow multi-touch touch screens/panels that are inexpensive and that may have a relatively large touch surface (for example from 3 to 100 inches in size) and a small thickness, to be obtained.

These two technologies involve:
(i) injecting infrared (IR) radiation, using LEDs for example, into a substrate that is transparent in the infrared, from one or more edges/edge faces;
(ii) propagating the infrared radiation inside said substrate (which then plays the role of a waveguide) via a total-internal-reflection optical effect (no radiation "escapes" from the substrate);
(iii) bringing the surface of the substrate into contact with some sort of object (for example, a finger or a stylus) so as to cause a localized disturbance by scattering of radiation in all directions; certain of the deviated rays will thus be able to "escape" from the substrate.

In FTIR technology, the deviated rays form a spot of infrared light on the lower surface of the substrate, i.e. on the surface opposite the touch surface. These deviated rays are detected by a special camera located behind the device.

For its part, PSD technology involves two additional steps after steps (i)-(iii):
(iv) analysing, with a detector, the resulting IR radiation at the edge of the substrate; and
(v) calculating, algorithmically, the position(s) of the object(s) making contact with the surface, from the detected radiation. This technology is especially described in document US 2013/021300 A1.

Fundamentally, glass is a material of choice for touch panels due to its mechanical properties, its durability, it scratch resistance, its optical transparency and because it can be chemically or thermally toughened.

In the case of the glass panels used in PSD or FTIR technology and of very large area and therefore of a relatively large length/width, the optical path of the injected IR radiation is long. In this case, absorption of the IR radiation by the material of the glass therefore has a significant effect on the sensitivity of the touch panel, which may then undesirably decrease over the length/width of the panel. In the case of glass panels used in PSD or FTIR technology and of smaller area, and therefore with a shorter optical path of the injected IR radiation, the absorption of the IR radiation by the material of the glass also has an effect, in particular on the power consumption of the device incorporating the glass panel.

Thus, a glass sheet highly transparent in the infrared is extremely useful in this context, in order to guarantee undegraded or satisfactory sensitivity over the entirety of the touch surface when this surface is large in area. In particular, a glass sheet having an absorption coefficient in the range of wavelengths from 780 to 1200 nm, which wavelengths are generally used in these technologies, equal to or even smaller than 1 $m^{-1}$ is ideal.

In order to obtain a high transmission in the infrared (and in the visible), it is known to decrease the total iron content in the glass (expressed in terms of $Fe_2O_3$ according to standard practice in the field) and thus obtain a glass with a low iron content (or "low iron" glass). Silicate glass always contains iron because the latter is present as an impurity in most of the batch materials used (sand, limestone, dolomite, etc.). Iron exists in the structure of the glass in the form of ferric ions $Fe^{3+}$ and ferrous ions $Fe^{2+}$. The presence of ferric ions $Fe^{3+}$ makes the glass weakly absorbing at short wavelengths in the visible and strongly absorbing in the near ultraviolet (absorption band centred on 380 nm), whereas the presence of ferrous ions $Fe^{2+}$ (sometimes expressed in FeO oxide) is responsible for strong absorption in the near infrared (absorption band centred on 1050 nm). Thus, increasing total iron content (content of iron in its two forms) accentuates absorption in the visible and infrared. In addition, a high concentration of ferrous ions $Fe^{2+}$ decreases transmission in the infrared (in particular in the near infrared). However, to attain an absorption coefficient that is sufficiently low for touch applications in the range of wavelengths from 780 to 1200 nm merely by changing total iron content would require such a large decrease in this total iron content that (i) it would lead to production costs that would be much too high, due to the need for very pure batch materials (materials of sufficient purity in certain cases not even existing), and (ii) it would cause production problems (especially premature wear of the furnace and/or difficulties with heating the glass in the furnace).

It is also known, to further increase the transmission of the glass, to oxidize the iron present in the glass, i.e. to decrease the number of ferrous ions to the gain of ferric ions. The degree of oxidation of a glass is given by its redox ratio, defined as the ratio by weight of $Fe^{2+}$ atoms to the total weight of iron atoms present in the glass i.e. $Fe^{2+}$/total Fe.

In order to decrease the redox ratio of the glass, it is known to add an oxidizing agent to the blend of batch materials. However, most known oxidants (sulphates, nitrates, etc.) do not have a high enough oxidation power to attain the IR transmission values sought for touch-panel applications using FTIR or PSD technology.

3 OBJECTIVES OF THE INVENTION

One objective of the invention, in at least one of its embodiments, is to provide a glass sheet having a high transmission in the infrared. In particular, the objective of the invention is to provide a glass sheet having a high transmission in the near infrared.

Another objective of the invention, in at least one of its embodiments, is to provide a glass sheet that, when it is used as a touch surface in large-area touch screens, touch panels or touch pads, causes little or no decrease in the sensitivity of the touch function.

Another objective of the invention, in at least one of its embodiments, is to provide a glass sheet that, when it is used as a touch surface in more modestly sized touch screens, touch panels or touch pads, has an advantageous effect on the power consumption of the device.

Another objective of the invention, in at least one of its embodiments, is to provide a glass sheet having a high transmission in the infrared and having an acceptable appearance for the chosen application.

Finally, another objective of the invention is to provide a glass sheet having a high transmission in the infrared and that is inexpensive to produce.

4 SUMMARY OF THE INVENTION

The invention relates to a glass sheet having a composition that comprises, in an amount expressed in percentages by total weight of glass:

| | |
|---|---|
| $SiO_2$ | 55-85% |
| $Al_2O_3$ | 0-30% |
| $B_2O_3$ | 0-20% |
| $Na_2O$ | 5-25% |
| CaO | 0-20% |
| MgO | 0-15% |
| $K_2O$ | 0-20% |
| BaO | 0-20% |
| Total iron (expressed in $Fe_2O_3$ form) | 0.002-0.06%. |

According to the invention, said composition furthermore comprises one of the following components:
  manganese (expressed in MnO form), in an amount ranging from 0.01 to 1% by weight;
  antimony (expressed in $Sb_2O_3$ form), in an amount ranging from 0.01 to 1% by weight;
  arsenic (expressed in $As_2O_3$ form), in an amount ranging from 0.01 to 1% by weight;
  or
  copper (expressed in CuO form), in an amount ranging from 0.0002 to 0.1% by weight.

Thus, the invention is based on an approach that is completely novel and inventive because it allows the stated technical problem to be solved. Specifically, the inventors have demonstrated that it is possible, by combining in a glass composition a low iron content and a component chosen from manganese, antimony, arsenic or copper, to obtain a glass sheet that is very transparent in the IR, without having too much of a negative effect on its appearance and colour.

Throughout the present text, when a range is indicated it is inclusive of its limits. Furthermore, each and every integer value and sub-range in a numerical range are expressly included as though explicitly written. Furthermore, throughout the present text, unless otherwise indicated, percentage amount or content values are values by weight expressed relative to the total weight of the glass.

The glass sheet according to the invention may be made of glass belonging to various categories. The glass may thus be soda-lime-silica glass, aluminosilicate glass, borosilicate glass, etc. Preferably, and for reasons of lower production cost, the glass sheet according to the invention is a sheet of soda-lime-silica glass. In this preferred embodiment, the composition of the glass sheet may comprise, in an amount expressed in percentages by total weight of glass:

| | |
|---|---|
| $SiO_2$ | 60-78% |
| $Al_2O_3$ | 0-18% |
| $B_2O_3$ | 0-18% |
| $Na_2O$ | 5-20% |
| CaO | 0-15% |
| MgO | 0-10% |
| $K_2O$ | 0-10% |
| BaO | 0-5% |
| Total iron (expressed in $Fe_2O_3$ form) | 0.002-0.06%. |

More preferably, according to this embodiment, the composition of the glass sheet may comprise, in an amount expressed in percentages by total weight of glass:

| | |
|---|---|
| $SiO_2$ | 60-75% |
| $Al_2O_3$ | 0-6% |
| $B_2O_3$ | 0-4% |
| CaO | 0-15% |
| MgO | 0-10% |
| $Na_2O$ | 5-20% |
| $K_2O$ | 0-10% |
| BaO | 0-5% |
| Total iron (expressed in $Fe_2O_3$ form) | 0.002-0.06%. |

Other features and advantages of the invention will become more clearly apparent on reading the following description.

Preferably, in the context of the invention the term "glass" refers to a totally amorphous material, any partially crystalline material (such as, for example, vitrocrystalline or glass-ceramic materials) being excluded.

The glass sheet according to the invention may be a glass sheet obtained by a float process, a drawing process, or a rolling process or any other known process for manufacturing a glass sheet from a molten glass composition. According to a preferred embodiment according to the invention, the glass sheet is a sheet of float glass. The expression "sheet of float glass" is understood to mean a glass sheet formed by the float process, which consists in pouring molten glass onto a molten tin bath under reducing conditions. As is known, a sheet of float glass has what is called a "tin side", i.e. a side on which the region of the glass near the surface of the sheet is enriched with tin. The expression "enriched with tin" is understood to mean an increase in tin concentration with respect to the composition of the core of the glass, which may be substantially zero (free of tin) or not.

The glass sheet according to the invention may be various sizes and relatively large. It may, for example, have dimensions ranging up to 3.21 m×6 m or 3.21 m×5.50 m or 3.21 m×5.10 m or 3.21 m×4.50 m ("PLF" glass sheets) or even, for example, 3.21 m×2.55 m or 3.21 m×2.25 m ("DLF" glass sheets).

The glass sheet according to the invention may be between 0.1 and 25 mm in thickness. Advantageously, in the case of a touch-panel application, the glass sheet according to the invention may be between 0.1 and 6 mm in thickness. Preferably, in the case of a touch-screen application, for reasons of weight, the glass sheet according to the invention will be 0.1 to 2.2 mm in thickness.

According to the invention, the composition of the invention comprises a total iron content (expressed in terms of Fe$_2$O$_3$) ranging from 0.002 to 0.06% by weight relative to the total weight of the glass. A total iron content (expressed in Fe$_2$O$_3$ form) lower than or equal to 0.06% by weight allows the IR transmission of the glass sheet to be further increased. The minimum value ensures that the cost of the glass is not increased too much as such low iron values often require very pure, expensive batch materials or else purification of the latter. Preferably, the composition comprises a total iron content (expressed in Fe$_2$O$_3$ form) ranging from 0.002 to 0.04% by weight relative to the total weight of the glass. Most preferably, the composition comprises a total iron content (expressed in Fe$_2$O$_3$ form) ranging from 0.002 to 0.02% by weight relative to the total weight of the glass, or even from 0.002 to 0.015% by weight relative to the total weight of the glass.

Preferably, the composition comprises one of the following components:
  manganese (expressed in MnO form), in an amount ranging from 0.01 to 1% by weight;
  antimony (expressed in Sb$_2$O$_3$ form), in an amount ranging from 0.01 to 1% by weight;
  or
  copper (expressed in CuO form), in an amount ranging from 0.0002 to 0.1% by weight.

According to a first advantageous embodiment of the invention, the composition comprises manganese (expressed in MnO form), in an amount ranging from 0.02 to 1% by weight or, better still, from 0.02 to 0.5% by weight. Preferably, the composition comprises manganese (expressed in MnO form), in an amount ranging from 0.04 to 0.5% by weight, and more preferably, from 0.1 to 0.5% by weight and, even more preferably, from 0.2 to 0.5%.

According to a second advantageous embodiment of the invention, the composition comprises antimony (expressed in Sb$_2$O$_3$ form) or arsenic (expressed in As$_2$O$_3$ form), in an amount ranging from 0.02 to 1% by weight or, better still, from 0.02 to 0.5% by weight. Preferably, the composition comprises antimony (expressed in Sb$_2$O$_3$ form) or arsenic (expressed in As$_2$O$_3$ form), in an amount ranging from 0.05 to 0.5% by weight or, better still, from 0.1 to 0.5% by weight. Entirely preferably, the composition comprises antimony (expressed in Sb$_2$O$_3$ form) or arsenic (expressed in As$_2$O$_3$ form), in an amount ranging from 0.1 to 0.3% by weight. In this second embodiment, the composition of the invention preferably comprises antimony. Antimony is preferred to arsenic in the composition of the invention for environmental and safety reasons.

According to a third advantageous embodiment of the invention, the composition comprises copper (expressed in CuO form), in an amount ranging from 0.0005 to 0.05% by weight or, better still, from 0.001 to 0.05% by weight. Preferably, the composition comprises copper (expressed in CuO form), in an amount ranging from 0.001 to 0.02% by weight or, better still, from 0.002 to 0.02% by weight. Entirely preferably, the composition comprises copper (expressed in CuO form), in an amount ranging from 0.002 to 0.01% by weight.

According to yet another embodiment of the invention, the composition comprises an Fe$^{2+}$ content (expressed in FeO form) lower than 20 ppm. This content range allows very satisfactory properties to be obtained, in particular in terms of transmission of IR. Preferably, the composition comprises an Fe$^{2+}$ content (expressed in FeO form) lower than 10 ppm. Most preferably, the composition comprises an Fe$^{2+}$ content (expressed in FeO form) lower than 5 ppm.

According to the invention, the glass sheet possesses a high transmission in the IR. More precisely, the glass sheet of the present invention possesses a high transmission in the near infrared.

To quantify the good transmission of the glass in the infrared range, in the present description, the absorption coefficients at the wavelengths of 1050, 950 and 850 nm will be used, which, this being the case, must be as low as possible in order to obtain a good transmission. The absorption coefficient is defined by the ratio of the absorbance to the length of the optical path traced by an electromagnetic ray in a given medium. It is expressed in m$^{-1}$. It is therefore independent of the thickness of the material but depends on the wavelength of the absorbed radiation and on the chemical nature of the material.

In the case of glass, the absorption coefficient (µ) at a chosen wavelength λ may be calculated from a measurement of the transmission (T) and refractive index n of the material (thick=thickness), the values of n, ρ and T depending on the chosen wavelength λ:

$$\mu = -\frac{1}{\text{thick}} \cdot \ln\left[\frac{-(1-\rho)^2 + \sqrt{(1-\rho)^4 + 4 \cdot T^2 \cdot \rho^2}}{2 \cdot T \cdot \rho^2}\right]$$

where $$\rho = (n-1)^2/(n+1)^2$$

Advantageously, the glass sheet according to the invention has an absorption coefficient at a wavelength of 1050 nm lower than 5 m$^{-1}$. Preferably, the glass sheet according to the invention has an absorption coefficient at a wavelength of 1050 nm lower than or equal to 2 m$^{-1}$. Most preferably, the glass sheet according to the invention has an absorption coefficient at a wavelength of 1050 nm lower than or equal to 1 m$^{-1}$.

Also advantageously, the glass sheet according to the invention has an absorption coefficient at a wavelength of 950 nm lower than 5 m$^{-1}$. Preferably, the glass sheet according to the invention has an absorption coefficient at a wavelength of 950 nm lower than or equal to 2 m$^{-1}$. Most preferably, the glass sheet according to the invention has an absorption coefficient at a wavelength of 950 nm lower than or equal to 1 m$^{-1}$.

Also advantageously, the glass sheet according to the invention has an absorption coefficient at a wavelength of 850 nm lower than 5 m$^{-1}$. Preferably, the glass sheet according to the invention has an absorption coefficient at a wavelength of 850 nm lower than or equal to 2 m$^{-1}$. Most preferably, the glass sheet according to the invention has an absorption coefficient at a wavelength of 850 nm lower than or equal to 1 m$^{-1}$.

According to one embodiment of the invention, the composition of the glass sheet may comprise, in addition to impurities, especially contained in the batch materials, a small proportion of additives (such as agents promoting melting or fining of the glass) or elements due to dissolution of the refractories forming the melting furnaces.

According to one advantageous embodiment of the invention, the composition of the glass sheet may furthermore comprise one or more colouring agents, in a suitable amount depending on the desired effect. This (these) colouring agent(s) may, for example, serve to "neutralize" the slight colour that may be generated by the presence of significant quantities of copper or manganese and thus make the colouring of the glass of the invention more neutral. Alternatively, this (these) colouring agent(s) may serve to obtain a particular, desired colour.

According to another advantageous embodiment of the invention, combinable with the preceding embodiment, the glass sheet may be coated with a layer or film that allows the slight colour that may be generated by the presence of significant quantities of manganese or copper to be modified or neutralized (for example a coloured PVB film).

The glass sheet according to the invention may advantageously be chemically or thermally tempered.

According to one embodiment of the invention, the glass sheet is coated with at least one thin, transparent and electrically conductive layer. A thin, transparent and conductive layer according to the invention may, for example, be a layer based on $SnO_2$:F, $SnO_2$:Sb or ITO (indium tin oxide), ZnO:Al or even ZnO:Ga.

According to another advantageous embodiment of the invention, the glass sheet is coated with at least one antireflective (or anti-reflection) layer. This embodiment is obviously advantageous in the case where the glass sheet of the invention is used as the front face of a screen. An antireflective layer according to the invention may, for example, be a layer based on low-refractive-index porous silica or it may be made up of a number of strata (multilayer), especially a multilayer of dielectric layers, said multilayer containing low- and high-refractive-index layers in alternation and terminating with a low-refractive-index layer.

According to another embodiment, the glass sheet is coated with at least one anti-smudge layer so as to limit/prevent smudges from soiling it. This embodiment is also advantageous in the case where the glass sheet of the invention is used as the front face of a touch screen. Such a layer may be combined with a thin, transparent and electrically conductive layer deposited on the opposite face. Such a layer may be combined with an antireflective layer deposited on the same face, the anti-smudge layer being placed on the exterior of the multilayer and therefore covering the antireflective layer.

The glass sheet according to the invention may also be treated on at least one of its main faces, for example frosted with an acid or base, so as to for example generate anti-smudge properties or even antireflection or antiglare properties. This is also especially advantageous in the case where the glass sheet of the invention is used as a touch surface/screen.

Depending on the desired applications and/or properties, other layers may be deposited on one and/or the other face of the glass sheet according to the invention.

Moreover, the invention also relates to a touch screen or touch panel or touch pad comprising at least one glass sheet according to the invention, defining a touch surface. All the embodiments described above with reference to the glass sheet of the invention therefore also apply to the touch screen or touch panel or touch pad according to the invention. According to one embodiment, the touch screen or touch panel or touch pad advantageously uses FTIR or PSD optical technology. In particular, for a screen, the glass sheet is advantageously placed over a display surface.

Finally, the invention also relates to the use of a glass sheet according to the invention, in a device employing infrared radiation propagating essentially inside said sheet. All the embodiments described above with reference to the glass sheet of the invention therefore also apply to the use according to the invention.

The expression "radiation propagating essentially inside the sheet" is understood to refer to radiation that propagates through the bulk of the glass sheet between the two main faces of the sheet.

Advantageously, according to one embodiment of the use according to the invention, the infrared radiation propagates by total internal reflection. In this embodiment, the infrared radiation may be injected into the glass sheet from one or more edges of said sheet. The expression "edge of the sheet" is understood to mean each of the four surfaces defined by the thickness of the sheet and substantially perpendicular to the two main faces of the sheet. Again in this embodiment and alternatively, the infrared radiation may be injected into the glass sheet from one or both main faces at a certain angle.

The following examples illustrate the invention but are not intended to limit its scope in any way.

EXAMPLES

Batch materials were blended in powder form and placed in a crucible in order to be melted, the blend having the base composition given in the following table.

| Base composition | Content [% by weight] |
|---|---|
| $SiO_2$ | 72 |
| CaO | 8.2 |
| $K_2O$ | 0.01 |
| $Na_2O$ | 14 |
| $SO_3$ | 0.3 |
| $Al_2O_3$ | 1 |
| MgO | 4.5 |
| $Fe_2O_3$ | 0.01 |

Various samples were prepared with the base composition kept the same and with manganese, antimony or copper in variable quantities (added in MnO oxide, $Sb_2O_3$ oxide and CuO oxide form, respectively). Sample 1 (reference sample) corresponds to a glass of the prior art having a low iron content (what is referred to as extra-clear glass) and no added manganese, antimony or copper. Samples 2-8 correspond to glass sheet compositions according to the invention.

The optical properties of each glass sample in sheet form were measured and, in particular, the absorption coefficients (N) were measured at wavelengths of 850, 950 and 1050 nm via a transmission measurement using a PerkinElmer Lambda 950 spectrophotometer equipped with a 150 mm-diameter integration sphere, the sample being placed in the entrance aperture of the sphere for the measurement.

The following tables show the variation ($\Delta$) in the absorption coefficient at wavelengths of 1050, 950 and 850 nm obtained as a function of the quantity of manganese (table 1), antimony (table 2) or copper (table 3), for samples according to the invention, relative to the value for the corresponding reference sample (without manganese, antimony or copper).

TABLE 1

| | Sample | | |
|---|---|---|---|
| | 2 | 3 | 4 |
| ppm manganese (expressed in MnO form) | 225 | 467 | 1809 |

TABLE 1-continued

| | Sample | | |
|---|---|---|---|
| | 2 | 3 | 4 |
| absorption coefficient Δ at 850 nm | −8% | −41% | −46% |
| absorption coefficient Δ at 950 nm | −14% | −41% | −87% |
| absorption coefficient Δ at 1050 nm | −12% | −39% | −93% |

TABLE 2

| | Sample | |
|---|---|---|
| | 5 | 6 |
| ppm antimony (expressed in $Sb_2O_3$ form) | 781 | 1542 |
| absorption coefficient Δ at 850 nm | −37% | −63% |
| absorption coefficient Δ at 950 nm | −39% | −60% |
| absorption coefficient Δ at 1050 nm | −36% | −59% |

TABLE 3

| | Sample | |
|---|---|---|
| | 7 | 8 |
| ppm copper (expressed in CuO form) | 65 | 80 |
| absorption coefficient Δ at 850 nm | −47% | −46% |
| absorption coefficient Δ at 950 nm | −61% | −59% |
| absorption coefficient Δ at 1050 nm | −62% | −64% |

These results show that adding manganese, antimony or copper, in a content range according to the invention, allows the absorption coefficient at the wavelengths of 850, 950 and 1050 nm to be significantly decreased, and therefore, generally, the absorption of radiation in the near infrared to be decreased.

The invention claimed is:

1. A touch screen or touch panel or touch pad, comprising:
a glass sheet as a touch surface, the glass sheet comprising, in an amount expressed in percentages by total weight of glass:
55 to 85% of $SiO_2$;
0 to 30% of $Al_2O_3$;
0 to 20% of $B_2O_3$;
5 to 25% of $Na_2O$;
0 to 20% of CaO;
0 to 15% of MgO;
0 to 20% of $K_2O$;
0 to 20% of BaO;
0.002 to 0.06% of total iron, expressed in $Fe_2O_3$ form; and
at least one component selected from the group consisting of:
0.01 to 1% of manganese, expressed in MnO form; and
0.0002 to 0.1% of copper, expressed in CuO form.

2. The touch screen or touch panel or touch pad according to claim 1, wherein the glass sheet comprises 0.02 to 1% by weight of manganese, expressed in MnO form.

3. The touch screen or touch panel or touch pad according to claim 1, wherein the glass sheet comprises 0.02 to 0.5% by weight of manganese, expressed in MnO form.

4. The touch screen or touch panel or touch pad according to claim 1, wherein the glass sheet comprises 0.04 to 0.5% by weight of manganese, expressed in MnO form.

5. The touch screen or touch panel or touch pad according to claim 1, wherein the glass sheet comprises 0.1 to 0.5% by weight of manganese, expressed in MnO form.

6. The touch screen or touch panel or touch pad according to claim 1, wherein the glass sheet comprises 0.0005 to 0.05% by weight of copper, expressed in CuO form.

7. The touch screen or touch panel or touch pad according to claim 1, wherein the glass sheet comprises 0.001 to 0.05% by weight of copper, expressed in CuO form.

8. The touch screen or touch panel or touch pad according to claim 1, wherein the glass sheet comprises 0.001 to 0.02% by weight of copper, expressed in CuO form.

9. The touch screen or touch panel or touch pad according to claim 1, wherein the glass sheet comprises 0.002 to 0.02% by weight of copper, expressed in CuO form.

10. The touch screen or touch panel or touch pad according to claim 1, wherein the glass sheet comprises 0.002 to 0.01% by weight of copper, expressed in CuO form.

11. The touch screen or touch panel or touch pad according to claim 1, wherein the glass sheet has an absorption coefficient at a wavelength of 1050 nm lower than 5 $m^{-1}$.

12. The touch screen or touch panel or touch pad according to claim 1, adapted for using FTIR or PSD optical technology.

13. A method of detecting a position of one or more objects on a surface of the glass sheet according to claim 1, comprising propagating infrared radiation essentially inside said sheet.

14. The method according to claim 13, wherein the infrared radiation propagates by total internal reflection.

15. A touch screen or touch panel or touch pad, comprising:
a glass sheet as a touch surface, the glass sheet comprising, in an amount expressed in percentages by total weight of glass:
60 to 75% of $SiO_2$;
0 to 6% of $Al_2O_3$;
0 to 4% of $B_2O_3$;
5 to 20% of $Na_2O$;
0 to 15% of CaO;
0 to 10% of MgO;
0 to 10% of $K_2O$;
0 to 5% of BaO;
0.002 to 0.06% of total iron, expressed in $Fe_2O_3$ form; and
at least one component selected from the group consisting of:
0.01 to 1% of manganese, expressed in MnO form; and
0.0002 to 0.1% of copper, expressed in CuO form,
wherein the touch screen or touch panel or touch pad is adapted for using FTIR or PSD optical technology.

16. The touch screen or touch panel or touch pad according to claim 15, wherein the glass sheet has an absorption coefficient at a wavelength of 1050 nm lower than 5 $m^{-1}$.

17. The touch screen or touch panel or touch pad according to claim 15, adapted for using FTIR or PSD optical technology.

18. A touch screen or touch panel or touch pad, comprising:

a glass sheet as a touch surface, the glass sheet comprising, in an amount expressed in percentages by total weight of glass:

55 to 85% of $SiO_2$;
0 to 30% of $Al_2O_3$;
0 to 20% of $B_2O_3$;
5 to 25% of $Na_2O$;
0 to 20% of CaO;
0 to 15% of MgO;
0 to 20% of $K_2O$;
0 to 20% of BaO;
0.002 to 0.06% of total iron, expressed in $Fe_2O_3$ form; and
0.0002 to 0.1% of copper, expressed in CuO form.

19. The touch screen or touch panel or touch pad according to claim 18, wherein the glass sheet has an absorption coefficient at a wavelength of 1050 nm lower than 5 $m^{-1}$.

20. The touch screen or touch panel or touch pad according to claim 18, adapted for using FTIR or PSD optical technology.

\* \* \* \* \*